Dec. 22, 1959          W. STELZER ET AL          2,918,041
BOOSTER BRAKE MECHANISM
Filed June 6, 1957          4 Sheets-Sheet 1
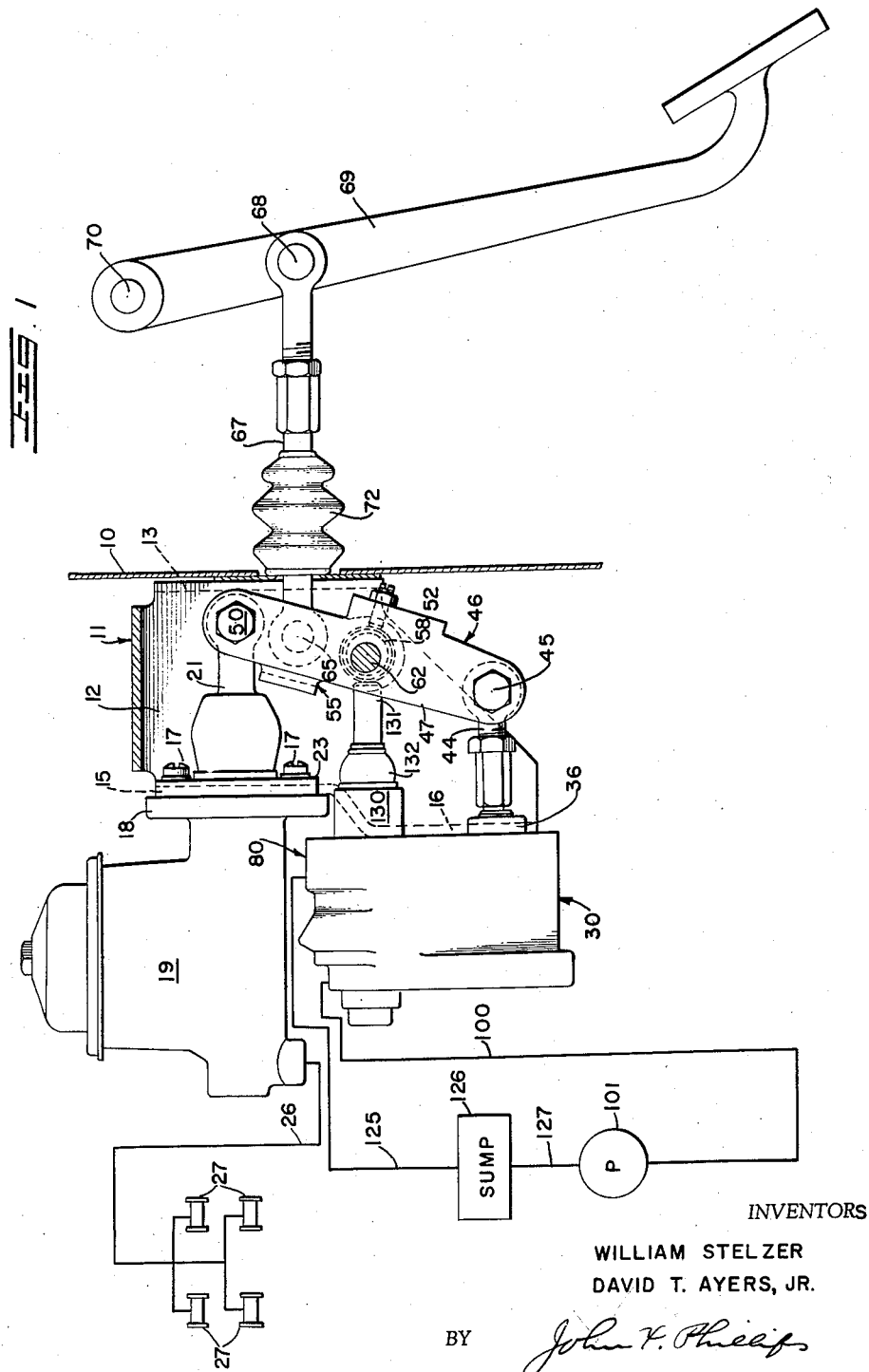
INVENTORS
WILLIAM STELZER
DAVID T. AYERS, JR.
BY
ATTORNEY

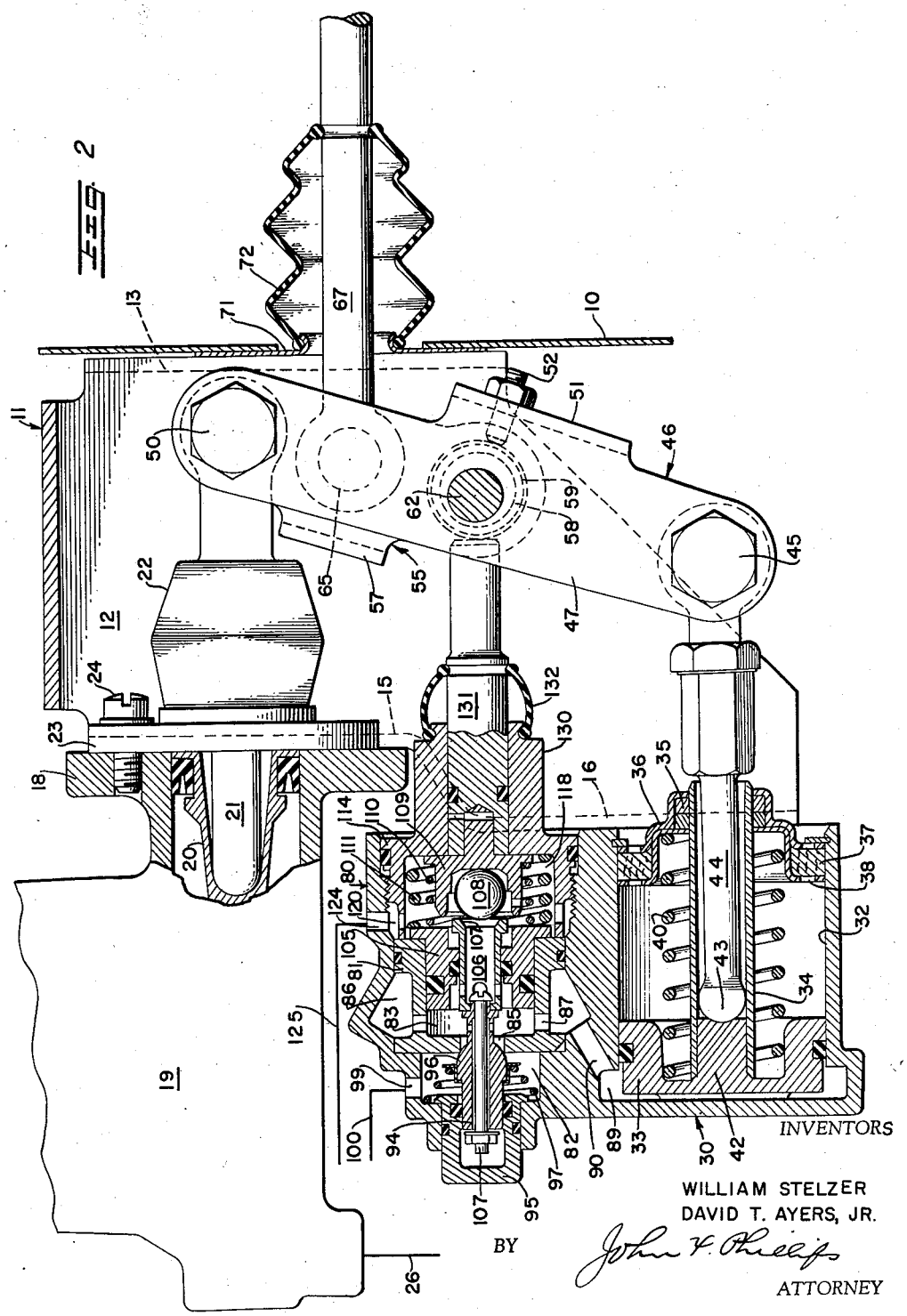

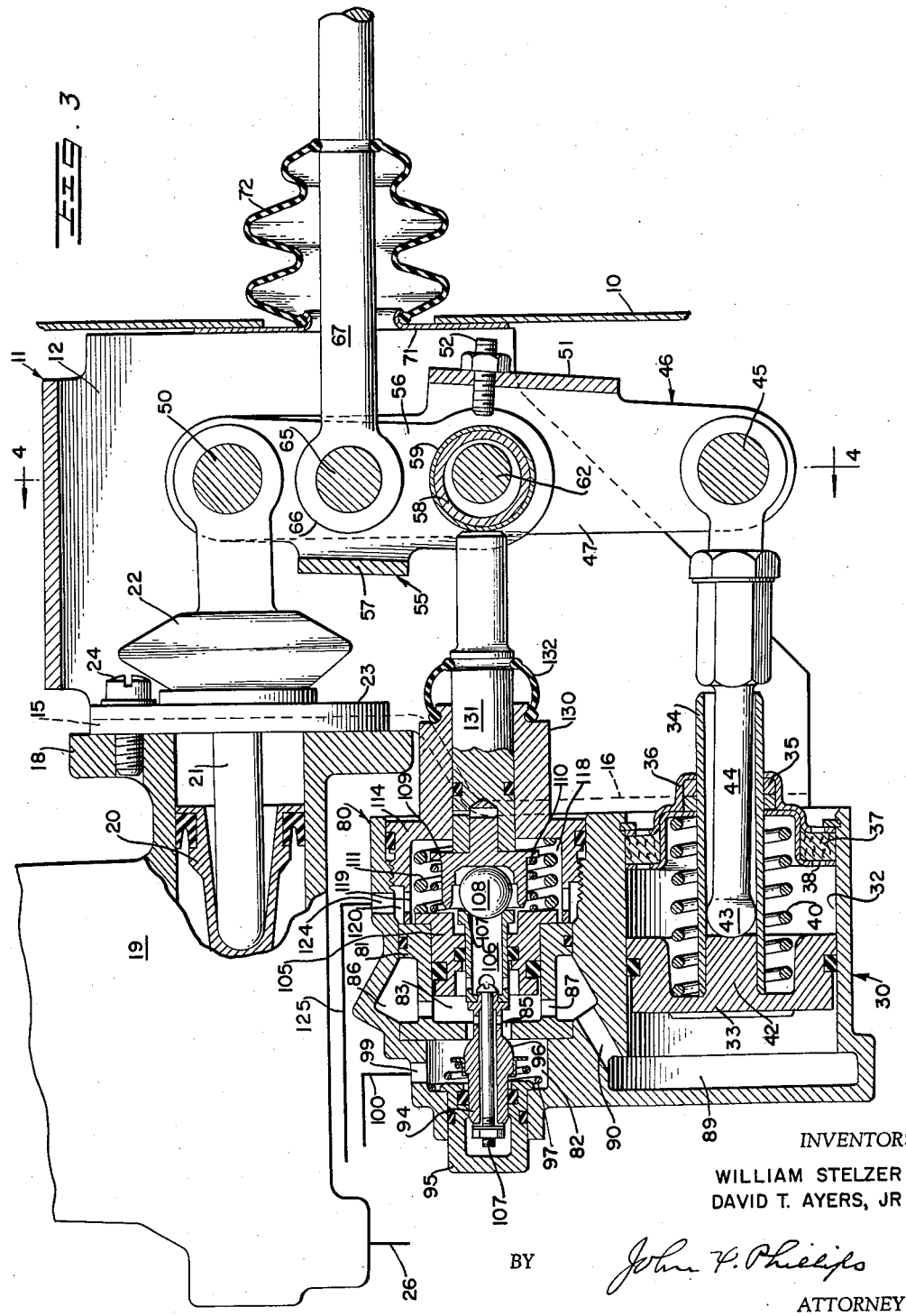

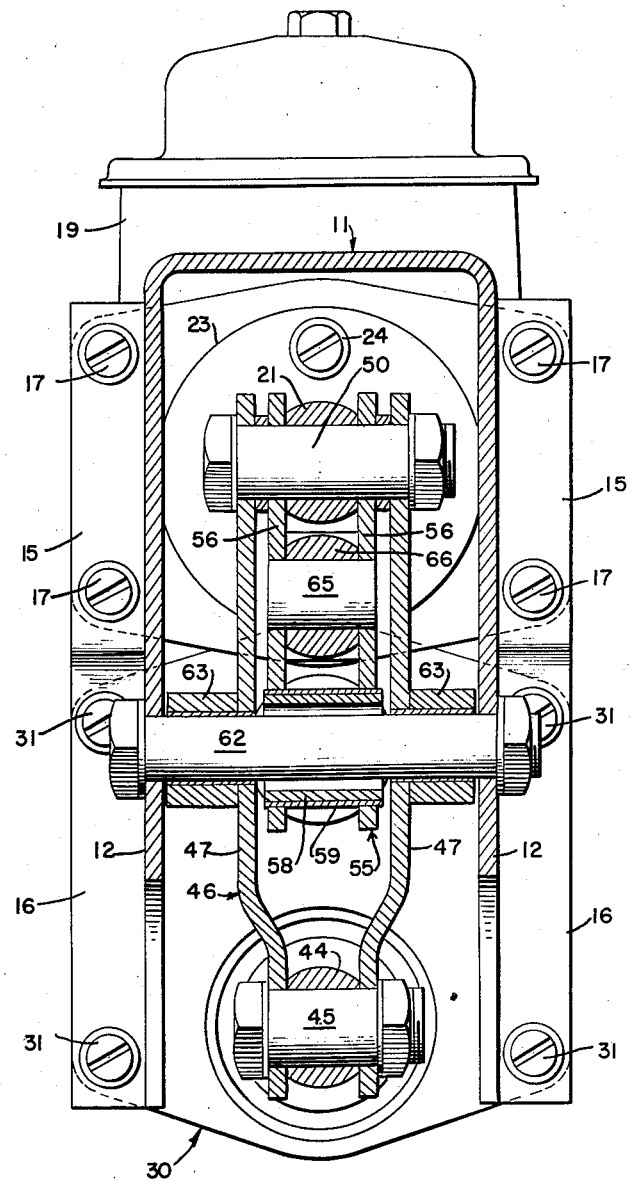

United States Patent Office 2,918,041
Patented Dec. 22, 1959

2,918,041

BOOSTER BRAKE MECHANISM

William Stelzer, Bloomfield Hills, and David T. Ayers, Jr., Birmingham, Mich., assignors to Kelsey-Hayes Company, Detroit, Mich., a corporation of Delaware Application June 6, 1957, Serial No. 664,134

12 Claims. (Cl. 121—41)

This invention relates to a booster brake mechanism, and more particularly to such a mechanism wherein a booster motor of the hydraulic fluid type is employed.

An important object of the invention is to provide a novel unit assembly of a master cylinder, motor and valve mechanism, which may be bodily assembled by bolting the unit to the fire wall of a motor vehicle.

A further object is to provide such a mechanism wherein the axes of the master cylinder, valve mechanism and motor are arranged in spaced parallel relation and wherein these devices are assembled as a unit by fixing them relative to a bracket structure to provide a pre-assembled unit which readily may be installed in a vehicle by fixing them relative to the vehicle fire wall.

A further object is to provide a mechanism of this character wherein the push rods for the master cylinder and valve mechanism and the piston rod of the motor are connected in cooperative relationship by a novel type of lever mechanism to which a rod leading from the brake pedal is connected to control the mechanism.

A further object is to provide an assembly of the character referred to wherein the piston rod for the motor is movable freely relative to the piston to provide for the pedal operation of the master cylinder, in the event of a failure of power in the motor, without the necessity for the operator's having to move the motor piston against friction or the loading of the conventional return spring associated with the piston.

A further object is to provide such an assembly of parts wherein a pivot pin carried by the supporting bracket for the assembly provides for the proper movement of the lever device through which the pedal and motor forces may be applied thereto and master cylinder plunger and valve operating forces may be transmitted therefrom without interference, but wherein movement of the lever device is so limited as to provide for a fixed pivot therefor in the event of a failure of power in the motor to directly apply pedal forces to the master cylinder plunger to operate it.

Other objects and advantages of the invention will become apparent during the course of the following description.

In the drawings I have shown one embodiment of the invention. In this showing:

Figure 1 is a side elevation of the mechanism, the fire wall and a portion of the supporting bracket being shown in section, certain parts of the system being shown diagrammatically;

Figure 2 is an enlarged vertical sectional view taken axially through the master cylinder, valve mechanism and motor, parts being broken away and parts being shown in section, the elements of the apparatus being shown in normal off positions;

Figure 3 is a similar view with the section extended through the lever mechanism and with the parts shown in operative positions; and Figure 4 is a section on line 4—4 of Figure 3.

Referring to Figure 1, the numeral 10 designates the fire wall of a motor vehicle forwardly of which is secured a bracket indicated as a whole by the numeral 11, which bracket is of inverted U-shape, as shown in Figure 4, to provide opposite parallel spaced side walls 12. At its rear extremity, the bracket 11 is provided with outstanding flanges 13 which may be bolted to the fire wall 10, the specific means for securing the bracket to the fire wall forming per se no part of the present invention.

At their forward extremities, the side walls 12 are provided with laterally extending upper and lower flange portions 15 and 16 (Figure 4). The bracket portions 15 are provided with screws 17 for attaching them to a flange 18 carried by a conventional master cylinder 19 in which is arranged the usual fluid displacing plunger 20 (Figure 3). This plunger is operable by a push rod 21 and a sealing boot 22 is connected between this push rod and a plate 23 forming a closure for the rear end of the master cylinder and secured in position with respect thereto by suitable screws 24. The outlet of the master cylinder 19 is connected by suitable lines 26 to the vehicle wheel cylinders 27 (Figure 1).

A motor indicated as a whole by the numeral 30 is fixed to the flange portions 16 by screws 31. Thus it will be apparent that the master cylinder 19 and motor 30 are both rigidly fixed to the bracket 11. The motor 30 is provided with a cylindrical bore 32 in which is slidable a piston 33 to which is fixed a tubular member 34 extending rearwardly from the piston through suitable packing 35 maintained in position by a double-walled keeper 36. Between the radially outer spaced portions of the walls of the keeper 36 is arranged an air cleaner 37 and the walls of the keeper are apertured as at 38 whereby the rear end of the bore 32 is always in communication with the atmosphere. A conventional return spring 40 is arranged between the keeper 36 and piston 33 to bias the latter rearwardly to its normal off position shown in Figure 2.

The tubular member 34 is fixed at its forward end to the piston 33 by surrounding an axial extension 42 as shown in Figures 2 and 3, and such extension forms an abutment engaging an hemispherical end 43 formed on a piston rod 44. The rear end of the piston rod is pivotally connected as at 45 to a lever indicated as a whole by the numeral 46.

The lever 46 comprises spaced side members 47 through the lower ends of which the pivot pin 45 passes, and the rear end of the piston rod 44 surrounds the pivot pin 45 between the lever arms 47. A pivot pin 50 extends through the upper ends of the lever arms 47 and the push rod 21 is connected to the pivot pin 50 as shown in Figure 4. The lever arms 47 are connected by a transverse member 51 (Figure 4) through which extends an adjusting screw 52 for a purpose to be described.

The pivot pin 50 also serves to pivotally connect to the push rod 21 and lever 46 a second lever 55 comprising parallel lever arms 56 (Figure 4) connected by a cross member 57 (Figure 3). At their lower ends, the lever arms 56 are provided with a sleeve 58 which may be surrounded by a bushing sleeve 59 for a purpose which will become apparent. A heavy pivot pin 62 is mounted at its ends in the bracket walls 12 and extends loosely through the sleeve 58, and accordingly the lever 55 is free to move within predetermined limits relative to the pivot pin 62. The lever 46 is supported by the pivot pin 62. For this purpose, the lever arms 47 are provided with sleeves 63 welded or otherwise secured thereto and preferably internally bushed to provide a bearing connection of the lever 46 with the pivot pin 62.

Between the pivot pins 50 and 62, another pivot pin 65 is connected between the lever arms 56 and is connected to the forward end 66 of a push rod 67. This push rod is pivotally connected as at 68 to a conventional brake pedal 69, preferably of the depending type, pivotally supported at its upper end as at 70. A plate 71 is fixed to the rear end of the bracket 11 and is arranged against the fire wall 10, and serves to support the rear end of a conventional boot 72, the forward end of which is connected to the push rod 67.

A valve housing 80 is formed integral with the motor 30. The valve housing is provided therein with a cup-shaped member 81 the transverse wall of which forms with the housing 80 a chamber 82 and separates such chamber from another chamber 83 formed in the member 81. The transverse wall of the member 81 is provided with a port 85, the rear end of which forms a valve seat for a purpose to be described. The member 81 also forms with the housing 80 a control chamber 86 communicating with the chamber 83 through ports 87. The forward end of the motor bore 32 is enlarged as at 89 to form a groove communicating through a passage 90 with the chamber 86.

A valve body 94 is slidable into a cup 95 in sealed relation therewith, this cup being carried by the valve housing 80 in axial alinement with the valve body. A valve 96 is formed integral with the valve body 94 and normally engages the valve seat formed by the rear end of the port 85, as shown in Figure 2. The valve 96 is biased to closed position by a spring 97.

The chamber 82 communicates through a port 99 with a line 100 leading to the outlet side of a pump 101. This pump maintains a constant predetermined relatively high pressure in the chamber 82. The valve mechanism per se forms no part of the present invention and is disclosed in detail and claimed in the copending application of William Stelzer, Serial No. 652,433, filed April 12, 1957. In accordance with the disclosure of such application, the valve 96 is pressure-balanced, and accordingly is maintained on its seat solely by the spring 97.

A reaction member 105 is slidable in the member 81 and is limited in its movement to the left to its off position as shown in Figure 2 by engagement with the member 81. A tubular member 106 is slidable in the reaction member 105 and is fixed by a bolt 107 to the valve body 94. The tubular member 106 is apertured as shown to communicate with the chamber 83.

At its right-hand end as viewed in Figures 2 and 3, the tubular member 106 is provided with a valve seat 107 engageable by, but normally disengaged from, a ball valve 108. This valve is arranged in a cup 109 and is movable thereby in a manner to be described to close the port 107 and then transmit movement through the tubular member 106 to the valve 96 to open such valve to activate the motor 30. A relatively light spring 110 biases the cup 109 to its normal off position shown in Figure 2, and a heavier spring 111 biases the reaction member 105 to its normal off position. The rear end of the spring 111 seats against a plug 114 threaded in the forward end of the valve body 80, and the forward end of the plug 114 maintains the cup-shaped member 81 in position in the valve body.

Within the plug 114 is formed a chamber 118 communicating through ports 119 with an annular chamber 120 formed in the valve body, and this chamber communicates through a port 124 with a line 125 through which fluid is returned to a sump 126 connected to the intake side of the pump 101 as at 127.

The plug 114 is provided with an axially extending bearing 130 in which is slidable a push rod 131, and this rod is connected to the cup member 109 as shown. A sealing boot 132 is connected between the rod 131 and the bearing 130. The rear end of the rod 131 bears against the sleeve bushing 59 so that movement of the lever 55 transmits movement to the rod 131 to operate the valve mechanism. It will be apparent that rearward movement of the lever 55 is limited by the set screw 52, thus limiting rearward movement of the rod 67 and pedal 69 to their normal off positions.

*Operation*

The master cylinder and the motor unit are fixed to the flange portions 15 and 16 before the installation of the apparatus. The unit thus assembled may then be directly bolted to the fire wall 10 and the boot 72 connected as shown. It then merely is necessary to connect the push rod 67 to the brake pedal.

The parts normally occupy the positions shown in Figure 2, the valve 96 being closed and the valve 108 open. Pressure is trapped in the chamber 82, and the motor chamber formed by the groove 89 will be open through passage 90, ports 87, chamber 83, the interior of the tubular member 106, chambers 118 and 120, and port 124 to the line 125 leading to the sump 126, which is open to the atmosphere. Accordingly, no pressure will exist in the pressure chamber of the motor. The lever mechanism will occupy the position shown in Figure 2, the bearing bushing 59 engaging the adjacent end of the push rod 131 and also engaging the screw 52. It will be apparent that the opening through the bushing 58 is substantially larger than the pivot pin 62 and the latter will be arranged with its axis to the left of the axis of the sleeve 58, as shown in Figure 2. When the apparatus is to be operated, the pedal 69 will be depressed to transmit movement through the rod 67 to the pivot pin 65. The lever 55 will pivot momentarily about the pivot pin 50, and the sleeve 59, carried by the lower end of the lever 55, will transmit movement through the rod 131 to seat the valve 108. The valve device will now be in lap condition, and the control chamber 83 will be disconnected from the outlet chamber 118. Further movement of the push rod 131 will cause the valve 108 to move the tubular member 106, and such movement will be transmitted to the valve 96 to open the port 85. Fluid under pressure now flows from the chamber 82 into the chamber 83, thence through port 87, chamber 86 and passage 90 into the motor chamber 89 to effect operation of the piston 33. Movement of the piston 33 will be transmitted through rod 44 to the pivot pin 45 to move the lower end of the lever 46 about the pivot pin 62. Thus, force will be transmitted through the pivot pin 50 to the push rod 21 to operate the master cylinder plunger 20 and thus displace fluid into the wheel cylinders.

During initial movement of the parts as described above, the operation of the valve mechanism takes place solely against the loading of the relatively light springs 97 and 110, thus providing a relatively soft pedal. Resistance to movement of the pedal, however, increases as soon as the valve 96 is opened since the portion of the ball valve 108 exposed to the interior of the tubular member 106 is subject to pressure admitted into the chamber 83. This causes resistance to movement of the brake pedal in turning the lever 55 and constitutes the initial stage of reaction against the brake pedal and predetermines the pedal generated force applied through pivot pins 65 and 50 to the master cylinder plunger 20.

Pressure in the chamber 83 and in the motor chamber 89 will continue to increase during the stage of initial reaction provided by pressure acting against the ball 108. During this time, the sleeve 58 remains out of contact with the pivot pin 62. When pressure in the chamber 83 reaches a predetermined point in accordance with the loading of the spring 111, the reaction member 105 will move to the right of the position shown in Figures 2 and 3 and will engage against the edge of the cup 109. A much greater pressure responsive area will now be affected by pressure in the chamber 83 to act against the push rod 131 to oppose movement thereof. This pressure will be transmitted through the rod 131 to the sleeve 58 and thus through the lever 55 through pin 65 and rod 67 to the brake pedal. Thus a second stage of reaction is provided against the brake pedal, such second stage representing a much higher ratio of reaction than is true during the initial stage.

During ordinary brake applications, the sleeve 58 will remain out of engagement with the pivot pin 62. However, if braking is desired beyond the point at which the motor is activated to its maximum extent, the operator is free to apply greater force to the brake pedal and thus to the pivot pin 65. When this occurs, the sleeve 58 will move to the left from the position shown in Figure 3 to engage firmly against the pivot pin 62, which now acts as a fixed pivot, and greater forces may be applied by the operator to the pivot pin 50 to increase the pedal generated force applied to the master cylinder plunger 20.

The brakes are released by releasing pressure against the brake pedal, whereupon the springs 97 and 110 will return the valve parts to normal position, the chamber 83 thus being disconnected from the chamber 82 and opened to the chamber 118 to exhaust the pressure from the motor. The spring 111 will return the reaction member 81 to normal position, and the spring 40 will return the motor piston 33 to its normal off position. The spring 110 will move the cup 109 against the adjacent end of the plug 114, and the rod 131 will be returned to normal position. This swings the lower end of the lever 55 back to its normal position and will move the bushing sleeve 59 into engagement with the screw 52.

In the event of a failure of power for the motor, it will be apparent that operation of the valve mechanism will not energize the motor and will not result in the transmission of any reaction forces to the pedal operated lever 55 by the push rod 131. This rod will be moved by the pedal operation solely against the loading of the springs 97 and 110. Upon a failure of power in the motor, therefore, movement of the pedal operated rod 67 will immediately move the sleeve 58 into engagement with the pivot pin 62, whereupon this pin acts as a fixed pivot for the lever 55, and solely pedal generated forces will be delivered through the lever 55 to the pivot pin 50 to operate the master cylinder plunger 20. Under such conditions, movement of the pivot pin 50 to the left in Figure 3 will move the pivot pin 45 to the right, the lever 46 also turning about the axis of the pin 62. Under such circumstances, the piston rod 44 will merely slide freely through the sleeve 34 without resistance, and accordingly the operator is relieved of the necessity of having to move the piston 33 against friction in the bore 32 and against the loading of the spring 40. There will accordingly be no loss of power delivered to the brake pedal and all forces will be utilized for operating the plunger 20.

From the foregoing it will be apparent that the general assembly of elements is such that all of the parts of the mechanism may be assembled as a unit by securing the master cylinder and motor unit to the bracket 11 prior to installation in the vehicle. This greatly facilitates installation. Moreover, the nature of the lever mechanism and the connection of the latter to the motor mechanism is such as to provide an efficient brake operation with two stages of direct hydraulic reaction transmitted to the brake pedal. In the event of a failure of power, there will be no hydraulic reaction transmitted to the brake pedal, and the operator is free to effect turning movement of the lever 55 for the transmission of all of the pedal generated forces to the master cylinder plunger.

It is to be understood that the form of the invention shown and described is to be taken as a preferred example of the same and that various changes in the shape, size, and arrangement of the parts may be made as do not depart from the spirit of the invention or the scope of the appended claims.

We claim:

1. A booster mechanism comprising a push rod, a motor having a cylinder and a piston therein defining a pressure chamber in one end of said motor, a piston rod engaging said piston, said push rod and said piston rod being in spaced substantially parallel relation, a first lever pivotally connected at one end to said push rod and at its other end to said piston rod, means intermediate the length of said lever engaging and supporting it for turning movement on a fixed axis, a second lever pivotally connected at one end to said push rod, a normally inoperative valve mechanism operable for connecting said motor chamber to a source of hydraulic pressure fluid, a stem parallel to said rods connected to said valve mechanism for operating it, said stem having mechanical engagement with the other end of said second lever, means exposed to pressure corresponding to pressure in said motor chamber when said valve mechanism is operated and having mechanical connection with said stem to transmit to said other end of said second lever a direct hydraulic resistance proportional to pressure in said motor chamber to oppose valve operating movement of said other end of said second lever, and pedal operable means connected to said second lever intermediate the ends thereof to operate it.

2. A mechanism according to claim 1 wherein said other end of said second lever has lost motion connection with respect to said first lever adjacent said fixed axis whereby, upon a failure of pressure in said source, no hydraulic resistance will be transmitted to said other end of said second lever and said lost motion connection will be taken up and said levers will turn as a unit about said fixed axis.

3. A mechanism according to claim 1 provided with a reaction device in said valve mechanism having a normal position, and a spring biasing said reaction device to said normal position, said reaction device having an area exposed to pressure equal to the pressure supplied to said motor chamber and operative when such pressure increases to a predetermined point to overcome said spring and mechanically transmit to said stem an increased hydraulic resistance to movement of said other end of said second lever.

4. A mechanism according to claim 1 wherein said engagement of said piston rod with said piston is an abutting engagement whereby said piston rod is movable freely away from said piston upon a failure in power in said source, and means providing a lost motion connection between said other end of said second lever and said first lever adjacent said fixed axis, whereby, upon a failure of power in said source, said lost motion will be taken up and said levers will turn as a unit about said fixed axis.

5. A mechanism according to claim 1 wherein said piston is provided with a tubular member projecting axially away from said pressure chamber, said piston rod being slidable in said tubular member and having solely an abutting engagement with said piston to be freely movable away from said piston, and a lost motion connection between said other end of said second lever and said first lever, whereby, upon a failure of power in said motor, said lost motion connection will be taken up and said levers will turn as a unit about said fixed axis.

6. A booster mechanism comprising a push rod, a motor having a cylinder and a piston therein defining a pressure chamber in one end of said motor, a piston rod engaging said piston, said push rod and said piston rod being in spaced substantially parallel relation, a first lever comprising spaced arms, a first pivot pin passing through one end of said arms and pivotally connecting them to said push rod, a second pivot pin extending through the other ends of said arms and pivotally connecting them to said piston rod, a fixed pivot pin passing through said arms intermediate the length thereof and pivotally supporting said first lever for turning movement, a second lever having spaced arms pivotally connected at one end to said first pivot pin, a normally inoperative valve mechanism operative for connecting said motor chamber to a source of hydraulic pressure to move said piston and transmit force to said second pivot pin, an operating stem for said valve mechanism substantially parallel to and between said push rod and said piston rod and having mechanical engagement with the other end of said second lever, pedal operable means connected to said second lever intermediate the ends thereof to effect turning movement of said second lever about said first pivot pin, and means exposed to pressure equal to the pressure supplied to said motor chamber and having mechanical engagement with said stem to oppose turning movement of said second lever about said first pivot pin with a reaction force proportional to pressure in said motor chamber.

7. A mechanism according to claim 6 provided with a sleeve connected between said other ends of the arms of said second lever, said sleeve surrounding said fixed pivot pin and having an internal diameter greater than the diameter of said fixed pivot pin whereby said other end of said second lever has lost motion connection with said fixed pivot pin to limit turning movement of said second lever about said first pivot pin, said stem engaging said sleeve.

8. A mechanism according to claim 6 provided with a reaction member having a normal position, an element connected to said stem and normally spaced from said reaction member a distance at least equal to the distance of movement of said stem necessary to operate said valve mechanism, and a spring biasing said reaction member to said normal position, said reaction member having an area exposed to pressure equal to the pressure in said motor chamber whereby, when such pressure increases to a predetermined point, said spring will be overcome and said reaction member will engage said element to increase the hydraulic resistance to valve operating movement of said stem.

9. A mechanism according to claim 6 provided with a reaction member having a normal position, an element connected to said stem and normally spaced from said reaction member a distance at least equal to the distance of movement of said stem necessary to operate said valve mechanism, a spring biasing said reaction member to said normal position, said reaction member having an area exposed to pressure equal to the pressure in said motor chamber whereby, when such pressure increases to a predetermined point, said spring will be overcome and said reaction member will engage said element to increase the hydraulic resistance to valve operating movement of said stem, and a sleeve connected to and extending between the other ends of the arms of said second lever, said sleeve surrounding and having an internal diameter greater than the diameter of said fixed pivot pin whereby said other end of said second lever has lost motion connection with said fixed pivot pin, said stem engaging said sleeve.

10. A booster mechanism comprising a bracket having spaced parallel side walls, a device to be operated carried by said bracket and having a push rod arranged with its axis parallel to and arranged between said side walls, a motor unit comprising a motor housing and a valve housing integral therewith fixed to said bracket, said valve housing being arranged between said push rod and said motor housing, said motor housing having a bore arranged with its axis between and parallel to said side walls, a piston in said bore defining with said motor housing a pressure chamber, a first lever arranged between said side walls, a fixed pivot pin carried by and extending between said side walls and pivotally supporting said first lever intermediate the ends thereof, a first pivot pin connecting the other end of said push rod to said first lever adjacent one end thereof, a piston rod engaging said piston, a second pivot pin connecting said piston rod to the other end of said first lever, a normally inoperative valve mechanism in said valve housing operative for connecting said pressure chamber to a source of fluid pressure, an operating stem connected to said valve mechanism, a second lever connected at one end to said first pivot pin and having mechanical engagement at its other end with said stem adjacent said fixed pivot pin, pedal operable means connected to said second lever between said first pivot pin and said fixed pivot pin for swinging said second lever about said first pivot pin to operate said valve mechanism, and reaction means exposed to pressure equal to the pressure supplied to said motor chamber when said valve mechanism is operative and having mechanical engagement with said stem to oppose turning movement of said second lever about said first pivot pin.

11. A mechanism according to claim 10 provided with an element within said valve mechanism carrying said reaction means, a reaction device having a normal position in which one end is spaced from said element, and a spring biasing said reaction device to said normal position, the other end of said reaction device being exposed to pressure equal to the pressure in said motor chamber whereby, when such pressure increases to a predetermined point, said spring will be overcome and the first-named end of said reaction device will engage said element to increasingly oppose turning movement of said second lever about said first pivot pin.

12. A mechanism according to claim 10 provided with lost motion means for limiting turning movement of said second lever about said first pivot pin whereby, upon a failure in pressure for operating said motor, said reaction means will not resist movement of said stem and said lost motion means will be taken up and said levers will turn as a unit about said fixed pivot pin.

References Cited in the file of this patent

UNITED STATES PATENTS

| | | |
|---|---|---|
| 1,468,602 | Loughead | Sept. 18, 1923 |
| 2,197,075 | Fitzgerald | Apr. 16, 1940 |
| 2,241,374 | Alfieri | May 13, 1941 |
| 2,259,832 | Rudolph | Oct. 21, 1941 |
| 2,358,753 | Willett et al. | Sept. 19, 1944 |
| 2,566,614 | Huyck | Sept. 4, 1951 |

FOREIGN PATENTS

| | | |
|---|---|---|
| 365,717 | Great Britain | Jan. 28, 1932 |
| 640,542 | Great Britain | July 19, 1950 |
| 830,004 | Germany | Jan. 31, 1952 |